(12) United States Patent
Busby

(10) Patent No.: US 6,264,878 B1
(45) Date of Patent: Jul. 24, 2001

(54) COMPOSITE BICYCLE FRAME AND METHOD OF MANUFACTURE

(76) Inventor: James S. Busby, 2516 Vista Dr., Newport Beach, CA (US) 92663

(*) Notice: Subject to any disclaimer, the term of this patent is extended or adjusted under 35 U.S.C. 154(b) by 0 days.

(21) Appl. No.: 09/234,330

(22) Filed: Jan. 20, 1999

Related U.S. Application Data

(63) Continuation-in-part of application No. 08/709,585, filed on Sep. 9, 1996, now Pat. No. 5,876,054, which is a continuation-in-part of application No. 08/519,568, filed on Aug. 25, 1995, now Pat. No. 5,803,476.

(51) Int. Cl.[7] ................................................. B29C 44/06

(52) U.S. Cl. .................. 264/516; 264/314; 280/281.1

(58) Field of Search ........................ 280/288.3, 274, 280/281.1, 288.1, 284; 264/257, 258, 279, 314, 317, 315, 316, 319, 512, 516, 520, 521

(56) References Cited

U.S. PATENT DOCUMENTS

| | | |
|---|---|---|
| D. 372,002 | 7/1996 | Busby et al. .................. D12/111 |
| 439,095 | 10/1890 | Becker . |
| 578,615 | 3/1897 | Travis . |
| 606,323 | 6/1898 | Wronski . |
| 657,667 | 9/1900 | Mills . |
| 944,795 | 12/1909 | Leet et al. . |
| 1,047,430 | 12/1912 | Michaelson . |
| 1,257,761 | 2/1918 | Strand . |
| 1,298,958 | 4/1919 | Johnston . |
| 1,412,012 | 4/1922 | Bruno . |
| 1,594,079 | 1/1926 | Tanner . |
| 3,833,242 | 9/1974 | Thompson, Jr. . |
| 3,917,313 | 11/1975 | Smith et al. .................. 280/284 |
| 4,322,088 | 3/1982 | Miyakoshi et al. .................. 280/284 |
| 4,506,755 | 3/1985 | Tsuchida et al. .................. 180/227 |
| 4,529,056 | 7/1985 | Kreuz .................. 180/227 |
| 4,673,053 | 6/1987 | Tanaka et al. .................. 180/227 |
| 4,789,174 | 12/1988 | Lawwill .................. 280/284 |
| 4,828,781 | 5/1989 | Duplessis et al. . |
| 4,850,607 | 7/1989 | Trimble .................. 280/281.1 |
| 4,889,355 | 12/1989 | Trimble .................. 280/281.1 |
| 4,902,458 | 2/1990 | Trimble .................. 264/46.6 |

(List continued on next page.)

FOREIGN PATENT DOCUMENTS

| | | | |
|---|---|---|---|
| 3033294 | 4/1981 | (DE) | .................. 280/285 |
| 220760 | 8/1924 | (GB) | . |
| 428442 | 12/1947 | (IT) | .................. 280/285 |

OTHER PUBLICATIONS

1992 Cannondale Spec. Suspension Mountain Bicycles—Article—4 pgs.
TREK 9000 Series Spec—"This Beauty Is a Beast"—Article—3 pgs.
Mountain Bike Action, Mar. '92—Fischer RS—1—Article—4 pgs.
Mountain Bike Action, Feb. '92 —Suspension Mania Strikes Cycling —3 pgs.
Mountain Bike Action, Mar. '92—Boulder Intrepid AL—2 pgs.
Mountain Bike Action, Jul. '92 —Team Shockblok—6 pgs.

*Primary Examiner*—Kevin Hurley
(74) *Attorney, Agent, or Firm*—Stetina Brunda Garred & Brucker

(57) ABSTRACT

A method for forming a bicycle frame comprising the initial step of placing a hollow core formed from a semi-rigid material and having a polymer impregnated fiber material applied thereto into a first mold section. A second mold section is then mated to the first mold section such that a cavity having a desired frame shape is defined therebetween. The core and the polymer impregnated fiber material applied thereto are then heated to a temperature level sufficient to make the core pliable. The core is then inflated so as to cause the polymer impregnated fiber material applied thereto to substantially conform to the shape of the cavity.

12 Claims, 1 Drawing Sheet

U.S. PATENT DOCUMENTS

| | | | |
|---|---|---|---|
| 4,923,203 | 5/1990 | Trimble et al. | 280/288.3 |
| 4,941,674 | 7/1990 | Trimble | 280/281.1 |
| 4,951,791 | 8/1990 | Belil Creixell | 180/219 |
| 4,982,975 | 1/1991 | Trimble | 280/281.1 |
| 4,985,949 | 1/1991 | Trimble | 264/258 |
| 4,997,197 | 3/1991 | Shultz | 280/275 |
| 5,076,601 * | 12/1991 | Duplessis | 280/281.1 |
| 5,080,385 * | 1/1992 | Duplessis | 280/281.1 |
| 5,098,114 | 3/1992 | Jones | 280/284 |
| 5,121,937 | 6/1992 | Lawwill | 280/284 |
| 5,158,733 | 10/1992 | Trimble | 264/258 |
| 5,205,572 | 4/1993 | Buell et al. . | |
| 5,215,322 | 6/1993 | Enders . | |
| 5,244,224 | 9/1993 | Busby . | |
| 5,259,637 | 11/1993 | Busby . | |
| 5,269,551 | 12/1993 | Martin et al. . | |
| 5,273,303 | 12/1993 | Hornzee-Jones . | |
| 5,368,804 | 11/1994 | Hwang et al. . | |
| 5,456,481 | 10/1995 | Allsop et al. . | |
| 5,464,240 | 11/1995 | Robinson et al. . | |
| 5,803,476 | 9/1998 | Olson et al. . | |
| 5,853,651 * | 12/1998 | Lindsay et al. | 264/512 |
| 5,876,054 | 3/1999 | Olson et al. . | |

\* cited by examiner

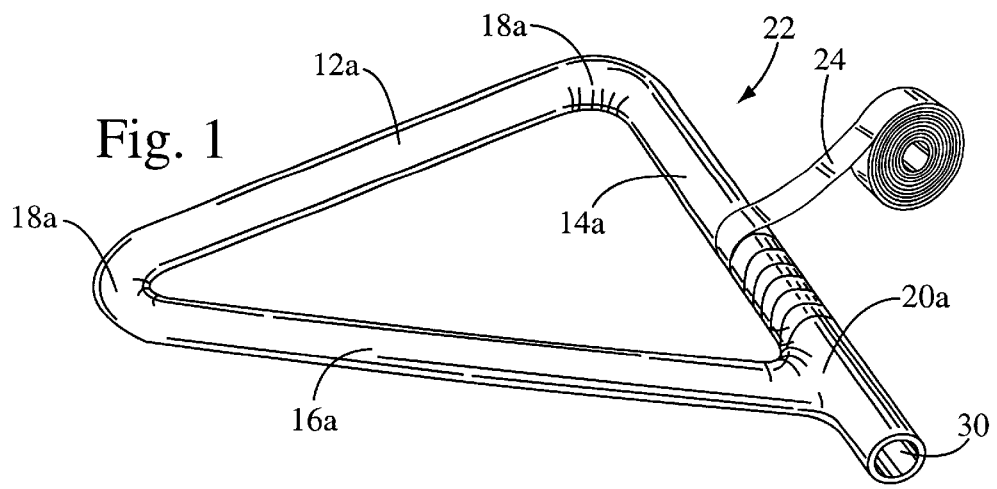
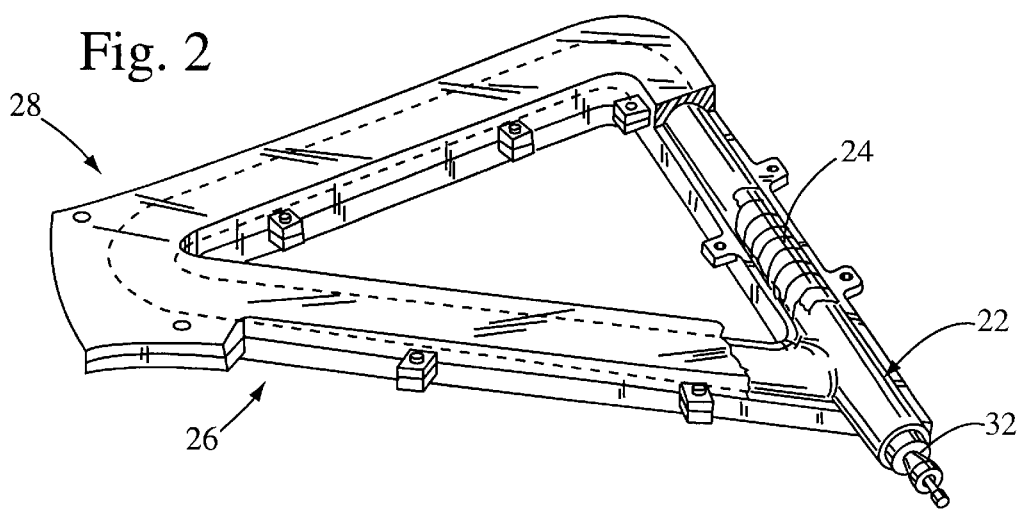
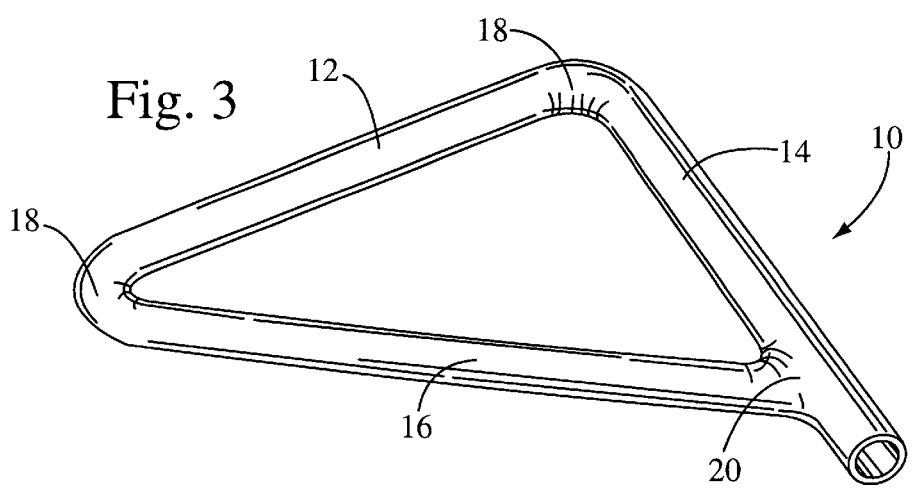

COMPOSITE BICYCLE FRAME AND METHOD OF MANUFACTURE

CROSS-REFERENCE TO RELATED APPLICATIONS

The present application is a continuation-in-part of U.S. application Ser. No. 08/709,585 entitled COMPOSITE BICYCLE FRAME AND METHOD OF MANUFACTURE filed Sep. 9, 1996 and now U.S. Pat. No. 5,876,054, which is a continuation-in-part of U.S. application Ser. No. 08/519,568 entitled COMPOSITE BICYCLE FRAME AND METHOD OF MANUFACTURE filed Aug. 25, 1995 and now U.S. Pat. No. 5,803,476 issued Sep. 8, 1998, the disclosures of which are incorporated herein by reference.

STATEMENT RE: FEDERALLY SPONSORED RESEARCH/DEVELOPMENT (Not Applicable)

BACKGROUND OF THE INVENTION

The present invention relates generally to bicycles, and more particularly to a method of manufacturing a hollow, monocoque carbon fiber bicycle frame which is lightweight, durable, and relatively inexpensive to manufacture and finish.

The fabrication of bicycle frames from fiber reinforced polymer composites is well known in the prior art. According to prior art fabrication methodology, these composite bicycle frames are typically constructed by first pre-forming the elongate, composite members thereof, and then interconnecting these members with composite joints. For example, in one commonly practiced prior art composite bicycle frame fabrication process, separate top tube, down tube, and seat tube members are initially formed from fiber reinforced polymer composites, and subsequently placed into a common fixture. The placement of these members into the fixture maintains their desired orientations while they are connected to each other by forming interconnecting joints therebetween with additional fiber reinforced polymer composite material.

As will be appreciated by those skilled in the art, though this particular prior art fabrication methodology provides a bicycle frame which is lightweight and durable, it is extremely time consuming and expensive. The high amount of labor and resultant expense is attributable to each of the interconnecting joints having to be individually fabricated by hand, and the need to conduct extensive finishing operations upon the frame to provide the same with the desired smooth, properly contoured outer surface. Thus, although the prior art has recognized to a limited extent the benefits of providing a lightweight and durable bicycle frame, the known fabrication methodologies for such frames have been time consuming and cost ineffective.

In recognition of the deficiencies of prior art fabrication methodologies which employ the use of fiber reinforced polymer composite materials, Applicant has developed the composite bicycle frames and associated manufacturing methodologies described and claimed in the above-listed parent applications. These improved methodologies facilitate the minimization or elimination of the prior art steps needed to provide the interconnection of the various frame members or components to each other, and provided the desired smooth overall finish to the bicycle frame, thus substantially reducing the amount of labor involved in the manufacturing process and hence reducing the associated costs.

More particularly, Applicant's previous methodologies involve the placement of an elongate, flexible and expandable bladder covered with a polymer impregnated fiber material into a first mold section, and subsequently mating a second mold section to the first mold section so as to define a cavity having a desired frame shape through which the bladder covered with the polymer impregnated fiber material is extended. The polymer impregnated fiber material is then heated, with the bladder being inflated so as to cause the material to substantially conform to the shape of the cavity. The frame tube fabricated from this process includes at least a top tube portion and a down tube portion, and is formed entirely from a single, continuous section of the fiber reinforced polymer composite.

Though this methodology provides the aforementioned advantages over the prior art, the use of a non-rigid bladder therein gives rise to a susceptibility for the material to flow into unknown folds and/or wrinkles in the bladder during the pressurization thereof. As will be recognized, the flow of material into any such folds and/or wrinkles during the fabrication process results in undesirable inconsistencies in the wall thickness of the completed frame tube. The present invention addresses this particular shortcoming by providing a similar fabrication methodology which employs the use of a semi-rigid core or bladder to allow for better control of the internal wall surface texture and wall thickness of the resultant frame tube due to the absence of any unknown folds and/or wrinkles in the core for the material to flow into during the process of pressurizing the core. As in Applicant's previous fabrication methodologies, the present method also provides an absolutely continuous layer of fiber material about the entire frame tube where needed as opposed to a simple overlap of material as described in many prior art fabrication methodologies. These and other advantages attendant to the present invention will be discussed in more detail below.

BRIEF SUMMARY OF THE INVENTION

In accordance with the present invention, there is provided a method for forming a bicycle frame. The method comprises the initial step of forming a hollow core or bladder from a semi-rigid material in a shape generally conforming to a desired frame shape for the bicycle frame. In the present application, a semi-rigid material is one which possesses selective phase change properties and is in a solid, rigid phase of a first hardness at room temperature, and transitions to a plastically deformable, expandable phase of a second hardness substantially less than the first hardness when subjected to elevated temperatures of a prescribed level.

Subsequent to the formation of the core, a layer of a polymer impregnated carbon fiber material is applied thereto. The polymer impregnated carbon fiber material is preferably provided in the form of an elongate strip which is wrapped about the core to substantially cover the same. Thereafter, the core having the polymer impregnated carbon fiber material applied thereto is placed into a first mold section, with a second mold section then being mated to the first mold section such that a cavity having the desired frame shape is defined therebetween.

After the second mold section has been mated to the first mold section, the core and the polymer impregnated carbon fiber material applied thereto are heated to an elevated temperature level sufficient to make the core pliable. The now semi-fluid core is internally pressurized and inflated so as to cause the polymer impregnated carbon fiber material applied thereto to substantially conform to the shape of the cavity. The heating of the core and the polymer impregnated carbon fiber material is preferably accomplished by heating the first and/or second mold sections, with the inflation of the core occurring as the same is being heated and reaches the prescribed temperature level at which is transitions from its solid, rigid phase to its plastically deformable, expandable phase. Subsequent to the inflation of the core, the first and second mold sections are cooled to form a continuous bicycle frame tube.

In the present method, the core is preferably formed from a semi-rigid material which becomes pliable or semi-fluid at approximately the same temperature level needed to facilitate the curing of the polymer impregnated carbon fiber material applied thereto. It is contemplated that the core may be formed from a plastic material via an injection molding process or a vacuum forming process. Additionally, the core is preferably formed to define at least one opening which is placeable into fluid communication with a pressurized fluid source for purposes of allowing the core to be internally pressurized as is needed to facilitate the inflation thereof after becoming pliable.

Further in accordance with the present invention, there is provided a bicycle frame formed in accordance with the above-described manufacturing methodology. The bicycle frame comprises a frame tube which defines at least a top tube portion and a down tube portion, and further preferably defines a seat tube portion. In view of the aforementioned fabrication process, the frame tube includes an outer layer which is formed entirely from a single, continuous section of the carbon fiber reinforced polymer composite material, and an inner layer which is integrally connected to the outer layer and formed from a single, continuous section of the semi-rigid material used to form the core.

BRIEF DESCRIPTION OF THE DRAWINGS

These, as well as other features of the present invention, will become more apparent upon reference to the drawings wherein:

FIG. 1 is a perspective view illustrating the manner in which a layer of a polymer impregnated fiber material is applied to a core employed in relation to the fabrication methodology of he present invention;

FIG. 2 is a perspective, cut-away view illustrating the manner in which the bladder having the layer of polymer impregnated fiber material applied thereto is oriented within a mold employed in relation to the fabrication methodology of the present invention; and FIG. 3 is a perspective view of a frame tube formed in accordance with the fabrication methodology of the present invention.

DETAILED DESCRIPTION OF THE INVENTION

Referring now to the drawings wherein the showings are for purposes of illustrating a preferred embodiment of the present invention only, and not for purposes of limiting the same, FIG. 3 perspectively illustrates a frame tube 10 constructed in accordance with the methodology of the present invention. The frame tube 10 may constitute the entirety or a portion of a bicycle frame, and may have other components attached thereto subsequent to the fabrication thereof. The frame tube 10 has a generally triangular configuration, and defines a top tube portion 12, a seat tube portion 14, and a down tube portion 16. The top and seat tube portions 12, 14 and top and down tube portions 12, 16 are each integrally connected to each other via respective arcuate regions 18. The seat tube portion 14 is integrally connected to the down tube portion 16 via a transitional region 20. Those of ordinary skill in the art will recognize that the frame tube 10 may be formed to include only two (2) of the above-described portions. In view of the preferred manufacturing or fabrication process for the frame tube 10 as will be discussed in more detail below, the frame tube 10 defines an outer layer which is formed entirely from a single, continuous section of a fiber reinforced polymer composite material, and preferably a carbon fiber reinforced polymer composite material. In addition to the outer layer, the frame tube 10 includes an inner layer which is integrally connected to the outer layer and is itself formed entirely from a single, continuous section of a semi-rigid material which will be identified below. As will be discussed in more detail below, the formation of the outer layer of the frame tube 10 from the polymer composite material reinforced with continuous carbon or other fibers provides the same with enhanced structural integrity, though being lightweight.

Having thus described the basic structural members or components of the frame tube 10, the preferred method of manufacturing or fabricating the same will now be discussed with particular reference to FIGS. 1 and 2. The preferred method comprises the initial step of forming a hollow bladder or core 22 from a semi-rigid material in a shape generally conforming to a desired frame shape for the bicycle frame. As such, the core 22 has a configuration which is virtually identical to that of the frame tube 10 formed in accordance with the present methodology. Thus, like the frame tube 10, the core 22 includes a top tube portion 12a, a seat tube portion 14a, a down tube portion 16a, a pair of arcuate regions 18a, and a transitional region 20a. As indicated above, for purposes of the present application, a "semi-rigid material" is one which possesses selective phase change properties and is in a solid, rigid phase of a first hardness at room temperature, and transitions to a plastically deformable, expandable phase of a second hardness substantially less than the first hardness when subjected to elevated temperatures of a prescribed level.

Subsequent to the formation of the core 22, a layer of the polymer impregnated carbon fiber material is applied thereto, and more particularly the outer surface thereof. The polymer impregnated carbon fiber material is preferably provided in the form of an elongate strip 24 which is helically wound or wrapped about the core 22 to substantially cover the same. In this respect, the strip 24 preferably comprises interwoven carbon fiber material which is impregnated with a thermoplastic or other polymer material. Those of ordinary skill in the art will recognize that the polymer impregnated carbon fiber material may also be provided in alternative forms, such as a continuous sheet which is cut as needed to wrap about the core 22.

As seen in FIG. 2, after having the layer of polymer impregnated carbon fiber material applied thereto, the core 22 is placed into a first mold section 26 which has a generally triangular configuration corresponding to the basic shape of the core 22, and hence the frame tube 10. In this respect, the first mold section 26 defines a top tube channel which accommodates the top tube portion 12a, a seat tube channel which accommodates the seat tube portion 14a, and a down tube channel which accommodates the down tube portion 16a. Also defined by the first mold section 26 are three (3) corner recesses which accommodate respective ones of the arcuate regions 18a and the transitional region 20a.

Subsequent to the placement of the wrapped core 22 into the lower, first mold section 26, an upper, second mold section 28 is mated to the first mold section 26. The second mold section 28 is sized and configured to be a mirror image of the first mold section 26. Upon the second mold section 28 being mated to the first mold section 26, a cavity having the desired frame shape is defined therebetween. As will be recognized, this cavity has a shape generally conforming to that of the core 22, and hence the frame tube 10. The core 22 extends throughout the cavity, with a slight gap typically being defined between the layer of polymer impregnated carbon fiber material applied to the core 22 and those surfaces of the second mold section 28 partially defining the cavity.

After the second mold section 28 has been mated to the first mold section 26, the core 22 and the polymer impregnated carbon fiber material applied thereto are heated to an elevated temperature level sufficient to make the core 22 pliable. The now semi-fluid core 22 is internally pressurized and inflated so as to cause the polymer impregnated carbon fiber material applied thereto to substantially conform to the shape of the cavity defined between the first and second mold sections 26, 28. The heating of the core 22 and the polymer impregnated carbon fiber material is preferably accomplished by heating the first and/or second mold sections 26, 28, with the inflation of the core 22 occurring as the same is being heated and reaches the prescribed temperature level at which it transitions from its solid, rigid phase to its plastically deformable, expandable phase. Subsequent to the inflation of the core 22, the first and second mold sections 26, 28 are cooled to form the continuous bicycle frame tube 10.

In the present method, the core 22 is preferably formed from a semi-rigid material which becomes pliable or semi-fluid at approximately the same temperature level needed to facilitate the curing of the polymer impregnated carbon fiber material applied thereto. It is contemplated that the core 22 may be formed from a plastic material via an injection molding process or a vacuum forming process. Additionally, as seen in FIG. 1, the core is preferably formed to define at least one opening 30 which fluidly communicates with the hollow interior thereof. The opening 30 is used to facilitate the fluid connection of a pressurized air source 32 to the core 22 in the manner shown in FIG. 2 for allowing the core 22 to be internally pressurized as is needed to facilitate the inflation thereof after becoming pliable. In this respect, upon being mated to each other, the first and second mold sections 26, 28 preferably collectively define a port which allows that section of the core 22 adjacent the transitional region 20a thereof and defining the opening 30 to protrude from within the mold assembly defined by the combined first and second mold sections 26, 28. Those of ordinary skill in the art will recognize that the opening 30 may be defined at virtually any location upon the core 22 as alternative to that shown in FIG. 1, and that the port defined by the combined first and second mold sections 26, 28 may be included in the mold assembly at any location needed to accommodate or align with the opening 30.

In the above-described fabrication process, the inflation of the core 22 results in the expansion of the layer of polymer impregnated carbon fiber material into any voids defined between the core 22 and those surfaces of the first and second mold sections 26, 28 collectively defining the cavity. As indicated above, the heating of the first and/or second mold sections 26, 28 and subsequent inflation/expansion of the core 22 facilitates the formation of the frame tube 10 from the carbon reinforced polymer composite. Typically, the first and/or second mold sections 26, 28 will continue to be heated for a pre-determined amount of time subsequent to the inflation of the core 22 as is needed to facilitate the curing of the polymer impregnated carbon fiber material. After the frame tube 10 has hardened as a result of the cooling of the first and second mold sections 26, 28, the second mold section 28 is detached or separated from the first mold section 26 to facilitate the removal of the completed frame tube 10 from therewithin. Either prior or subsequent to the detachment of the second mold section 28 from the first mold section 26, the pressurized air source 32 is disconnected from the completed frame tube 10. After being removed from within the first mold section 26, the completed frame tube 10 is finished, i.e., filled, sanded and/or polished, as is needed to remove the excess portion thereof defining the opening 30.

As will be recognized by those of ordinary skill in the art, the completed frame tube 10 includes the above-described outer layer which is formed by the cooled and hardened layer of the polymer impregnated carbon fiber material, and the above-described inner layer which is formed by the cooled and hardened plastic core 22. In view of the above-described fabrication process, the outer and inner layers are integrally connected to each other. Importantly, due to the manner in which the polymer impregnated carbon fiber material is expanded within the cavity by the inflation of core 22, the outer surface of the completed frame tube 10 is substantially continuous.

As is apparent from the foregoing, the present methodology employs the use of the "positive" core 22 in conjunction with the split female "negative" mold assembly collectively defined by the first and second mold sections 26, 28. Advantageously, in this methodology, an absolutely continuous layer of fiber material is provided about the entire frame tube 10 where needed as opposed to a simple overlap of material as described in many prior art fabrication methodologies. Additionally, the use of the core 22 allows for better control of the internal wall surface texture and wall thickness of the frame tube 10 due to the absence of any unknown folds and/or wrinkles in the core 22 for the material to flow into during the process of pressurizing the core 22.

Additional modifications and improvements of the present invention may also be apparent to those of ordinary skill in the art. Thus, the particular combination of steps and parts described and illustrated herein is intended to represent only one embodiment of the present invention, and is not intended to serve as limitations of alternative methods or devices within the spirit and scope of the invention.

What is claimed is:

1. A method for forming a bicycle frame, comprising the steps of:
   (a) forming a hollow core from a semi-rigid material in a shape generally conforming to a desired frame shape for the bicycle frame;
   (b) applying a layer of a polymer impregnated fiber material to the core;
   (c) placing the core having the polymer impregnated fiber material applied thereto into a first mold section;
   (d) mating a second mold section to the first mold section such that a cavity having the desired frame shape is defined therebetween;
   (e) heating the core and the polymer impregnated fiber material applied thereto to a temperature level sufficient to make the core pliable; and
   (f) internally pressurizing the core directly so as to inflate the core and to cause the polymer impregnated fiber material applied thereto to substantially conform to the shape of the cavity.

2. The method of claim 1 wherein step (a) comprises forming the core from a semi-rigid material which becomes pliable at approximately the same temperature level needed to facilitate the curing of the polymer impregnated fiber material.

3. The method of claim 2 wherein step (a) comprises forming the core from a plastic material.

4. The method of claim 1 wherein step (a) comprises forming the core via an injection molding process.

5. The method of claim 1 wherein step (a) comprises forming the core via a vacuum forming process.

6. The method of claim 1 wherein step (a) comprises forming the core to define at least one opening which is placeable into fluid communication with a pressurized fluid source to facilitate the internal pressurization of the core.

7. The method of claim 1 wherein step (b) comprises applying a layer of a polymer impregnated carbon fiber material to the core.

8. The method of claim 1 wherein the polymer impregnated fiber material is provided in the form of an elongate strip, and step (b) comprises wrapping the strip about the core.

9. The method of claim 1 wherein step (e) comprises heating the first and second mold sections.

10. The method of claim 1 wherein steps (e) and (f) are simultaneously conducted.

11. The method of claim 1 further comprising the step of:
(g) cooling the first and second mold sections subsequent to inflating the core to form a continuous bicycle frame tube.

12. A method for forming a bicycle frame, comprising the steps of:
(a) placing a hollow core formed from a semi-rigid material and having a polymer impregnated fiber material applied thereto into a first mold section;
(b) mating a second mold section to the first mold section such that a cavity having a desired frame shape is defined therebetween;
(c) heating the core and the polymer impregnated fiber material applied thereto to a temperature level sufficient to make the core pliable; and
(d) internally pressurizing the core directly so as to inflate the core and to cause the polymer impregnated fiber material applied thereto to substantially conform to the shape of the cavity.

* * * * *